(12) United States Patent
Gao et al.

(10) Patent No.: US 12,415,278 B2
(45) Date of Patent: Sep. 16, 2025

(54) ROBOTIC TOOL RECONFIGURATION SYSTEM

(71) Applicant: GM GLOBAL TECHNOLOGY OPERATIONS LLC, Detroit, MI (US)

(72) Inventors: Dalong Gao, Rochester, MI (US); Miguel Arturo Saez, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 417 days.

(21) Appl. No.: 17/986,327

(22) Filed: Nov. 14, 2022

(65) Prior Publication Data

US 2024/0157562 A1    May 16, 2024

(51) Int. Cl.
*B25J 15/00*  (2006.01)
*B25J 9/16*  (2006.01)

(52) U.S. Cl.
CPC ........... *B25J 9/1697* (2013.01); *B25J 9/1615* (2013.01); *B25J 15/0052* (2013.01)

(58) Field of Classification Search
CPC .... B25J 9/1697; B25J 9/1615; B25J 15/0052; B25J 9/1692; B25J 9/1612; B25J 15/0061; B25J 9/08; B25J 9/161; G01C 11/06; G05B 2219/39468
See application file for complete search history.

(56) References Cited

U.S. PATENT DOCUMENTS

| | | | |
|---|---|---|---|
| 11,947,329 B2* | 4/2024 | Wuerr | G05B 19/056 |
| 12,097,625 B2* | 9/2024 | Vu | G01S 17/89 |
| 2018/0250823 A1* | 9/2018 | Shimodaira | B25J 9/1612 |
| 2020/0405403 A1* | 12/2020 | Shelton, IV | A61B 17/3421 |
| 2021/0205995 A1* | 7/2021 | Vu | B25J 9/1666 |
| 2022/0361968 A1* | 11/2022 | Noonan | A61B 1/00149 |

(Continued)

FOREIGN PATENT DOCUMENTS

| | | |
|---|---|---|
| DE | 10 2012 207 249 B4 | 11/2016 |
| DE | 10 2016 208 456 B4 | 1/2019 |
| DE | 10 2019 104 013 A1 | 8/2019 |

(Continued)

OTHER PUBLICATIONS

U.S. Appl. No. 17/477,991, filed Sep. 17, 2021, Gao.
Office Action issued Jul. 24, 2024 in German Application No. 10 2023 110 627.9; 6pgs.

*Primary Examiner* — Masud Ahmed (57) ABSTRACT

A tool reconfiguration system includes a robot, an end effector, a photogrammetry module, an adjustment module, and a robot control module. The end effector is configured to be attached to the robot and to a vehicle component. The end effector is adjustable between a plurality of configurations. The photogrammetry module includes a first camera that is configured to capture images of the end effector. The adjustment module is configured to receive the images of the end effector and determine whether the end effector has been adjusted from a first configuration to a second configuration based on at least one of the images. The robot control module is configured to, based on the determination, selectively actuate one or more components of the end effector and adjust a present configuration of the end effector to one of the first configuration and the second configuration.

20 Claims, 3 Drawing Sheets

(56) References Cited

U.S. PATENT DOCUMENTS

2023/0103821 A1* 4/2023 Lovett .................. B25J 15/0066
  294/183

FOREIGN PATENT DOCUMENTS

| DE | 10 2019 113 764 A1 | 11/2020 |
| DE | 10 2018 103 805 B4 | 8/2021 |
| EP | 1 921 031 B1 | 7/2009 |

* cited by examiner

ROBOTIC TOOL RECONFIGURATION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle manufacturing and more particularly to a robotic tool reconfiguration system.

In a vehicle manufacturing plant, robots may transport a vehicle component from one location to another location. The robot may include a robot arm that is movable and an end effector attached to the robot arm. The end effector may attach to the vehicle component and be configurable into various styles based on the specific vehicle component.

SUMMARY

An example of a tool reconfiguration system includes a robot, an end effector, a photogrammetry module, an adjustment module, and a robot control module. The end effector is configured to be attached to the robot and to a vehicle component. The end effector is adjustable between a plurality of configurations. The photogrammetry module includes a first camera that is configured to capture images of the end effector. The adjustment module is configured to receive the images of the end effector and determine whether the end effector has been adjusted from a first configuration to a second configuration based on at least one of the images. The robot control module is configured to, based on the determination, selectively actuate one or more components of the end effector, and adjust a present configuration of the end effector to one of the first configuration and the second configuration.

In one example, the end effector includes two or more identifiers disposed on an outer surface of the end effector and the adjustment module is configured to determine whether the end effector has been adjusted from the first configuration to the second configuration using the identifiers captured in the at least one of the images.

In one example, the adjustment module is configured to determine coordinate systems on the end effector based on positions of the two or more identifiers, respectively. The adjustment module is configured to determine whether the end effector has been adjusted from the first configuration to the second configuration based on a change in the coordinate systems.

In one example, each of the coordinate systems includes an origin point, an X axis, a Y axis, and a Z axis.

In one example, the change includes a change in at least one of an X direction, a Y direction, and a Z direction.

In one example, the change includes a change in angle of at least one of an X direction, a Y direction, and a Z direction.

In one example, the robot control module is configured to store the second configuration in memory in response to receipt of user input indicating the end effector was intentionally adjusted from the first configuration to the second configuration.

In one example, a reconfiguration tool that is configured to actuate one or more of the components of the end effector.

In one example, the robot control module is configured to actuate the reconfiguration tool thereby actuating the one or more of the components of the end effector and adjusting the present configuration of the end effector to one of the first configuration and the second configuration.

In one example, the end effector includes a main rod, rod branches adjustably attached to the main rod, and an attachment device adjustably attached to each rod branch.

In one example, the end effector includes a first identifier disposed on the main rod. The adjustment module is configured to determine a first coordinate system on the main rod based on a position of the first identifier.

In one example, at least one rod branch of the rod branches is slidably and rotatably attached to the main rod using a first sleeve. The end effector includes a second identifier disposed on the first sleeve. The adjustment module is configured to determine a second coordinate system on the first sleeve based on a position of the second identifier.

In one example, the adjustment module is configured to determine a first change in the present configuration relative to the first configuration of the first sleeve using the first and second coordinate systems.

In one example, the attachment device is slidably and rotatably attached to the respective rod branch using a second sleeve. The end effector includes a third identifier disposed on the second sleeve. The adjustment module is configured to determine a third coordinate system on the second sleeve based on a position of the third identifier.

In one example, the adjustment module is configured to determine whether the end effector has been adjusted from the first configuration to the second configuration based on the first, second, and third coordinate systems.

In one example, the attachment device is a suction cup.

In one example, the photogrammetry module includes a second camera configured to capture second images. The adjustment module is configured to receive the second images of the end effector and determine whether the end effector has been adjusted from the first configuration to the second configuration based on the images and the second images.

An example of a tool reconfiguration method is provided. The method includes capturing images of an end effector that is adjustable between a plurality of configurations. The method includes determining whether the end effector has been adjusted from a first configuration to a second configuration based on at least one of the images. The method includes selectively actuating one or more components of the end effector and adjusting a present configuration of the end effector to one of the first configuration and the second configuration based on the determination.

In one example, the determining whether the end effector has been adjusted from the first configuration to the second configuration includes determining a first coordinate system based on a position of a first identifier that is disposed on the end effector and captured in the at least one of the images, determining a second coordinate system based on a position of a second identifier that is disposed on the end effector and captured in the at least one of the images, and determining whether the end effector has been adjusted from the first configuration to the second configuration based on a change in the first and second coordinate systems.

In one example, the method includes storing the second configuration in memory in response to receipt of user input indicating the end effector was intentionally adjusted from the first configuration to the second configuration.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present application involves a tool reconfiguration system for robots. Robots may include a robot arm and an end effector attached to the robot arm. In a vehicle manufacturing plant, the end effector may pick up and move a vehicle component from one location to another location. The end effector may be adjustable to a variety of different configurations, such as for different vehicle components. For example, attachment devices, such as suction cups, of the end effector may be individually adjustable between different configurations.

In one example, the configuration of the end effector may be adjusted using a hand tool. The configuration of the end effector may be adjusted, for example, such that one or more attachment devices contact a specific vehicle component in one or more improved locations. One or more attachment devices may also naturally move as a result of production or one or more environmental conditions. Examples of environmental conditions include a change in temperature within the vehicle manufacturing plant that causes bending or moving of one or more components of the end effector.

The attachment devices of the end effector may change without knowledge by the robot or a control module of the robot. Without the knowledge of movement, however, one or more collisions may occur. A tool reconfiguration system is needed in light of these challenges to identify whether the configuration of the end effector has changed and if so, to notify the robot control module of the present configuration.

Figure 1:
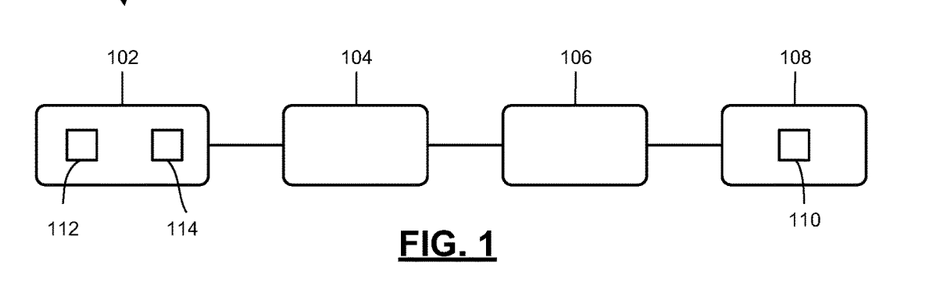
FIG. 1 is a functional block diagram of an example tool reconfiguration system.

FIG. 1 is a functional block diagram of a tool reconfiguration system 100. The tool reconfiguration system 100 may be disposed within a vehicle manufacturing plant of a vehicle original equipment manufacturer (OEM). The tool reconfiguration system 100 may include a photogrammetry module 102 (e.g., including a photogrammetry assembly), an adjustment module 104, a robot control module 106, and a robot 108 that is attachable to an end effector 110.

The photogrammetry module 102 may include one or more vision sensors (e.g., cameras) configured to capture vision data (e.g., images) of the robot 108. The visions sensors are positioned within the vehicle manufacturing plant to visually capture identifiers that are disposed on the end effector 110. Examples of identifiers include fiducials (e.g., reflective), quick response (QR) codes, markers, or another suitable type of visual identifier. The photogrammetry module 102 transmits the vision data to the adjustment module 104. The vision data may be transmitted by wire or wirelessly.

In the illustrated example, the photogrammetry module 102 includes a first camera 112 and a second camera 114 configured to capture first images and second images, respectively. The first camera 112 and the second camera 114 may be disposed on one side of the end effector 110 such that the first camera 112 is spaced from the second camera 114. Alternatively, the first camera 112 may be disposed on a first side of the end effector 110 and the second camera 114 may be disposed on a second side of the end effector 110. In one example, the second side may be opposite the first side, such as left to right. In another example, the second side may be perpendicular to, or any other suitable angle away from, the first side. The first and second cameras 112, 114 are configured to capture a field of view ranging from about 10 cubic meters ($m^3$) to about 15 $m^3$. The first and second cameras 112, 114 capture images at a rate of about 100 hertz (Hz) or another suitable frequency and a level of accuracy of about 0.1 millimeter (mm) or another suitable accuracy.

The adjustment module 104 defines a series of coordinate systems on the end effector 110 of the robot 108. Each coordinate system includes an origin point, an X-axis, a Y-axis, and a Z axis. In one example, the series of coordinates systems includes a reference coordinate system that may be defined based on a fixed component of the end effector 110 and additional coordinate systems that may be defined based on locations of adjustable components of the end effector 110. The adjustment module 104 is configured to determine whether the end effector 110 has been adjusted from an original configuration to a present configuration using the series of coordinate systems. If the end effector 110 had been adjusted, the adjustment module 104 automatically calculates the amount and direction of the adjustment (X direction, Y direction, Z direction, angular direction, etc.) and automatically generates a vision-servoing command based on the same. The vision-servoing command may be transmitted to the robot control module 106 by wire or wirelessly.

The robot control module 106 converts the vision-servoing command into a robot command and actuates the robot 108 based on the robot command. The robot command may be automatically transmitted to the robot 108 by wire or wirelessly. In this manner, the robot command is adjusted based on one or more differences between the original configuration and the present configuration.

Figure 2:
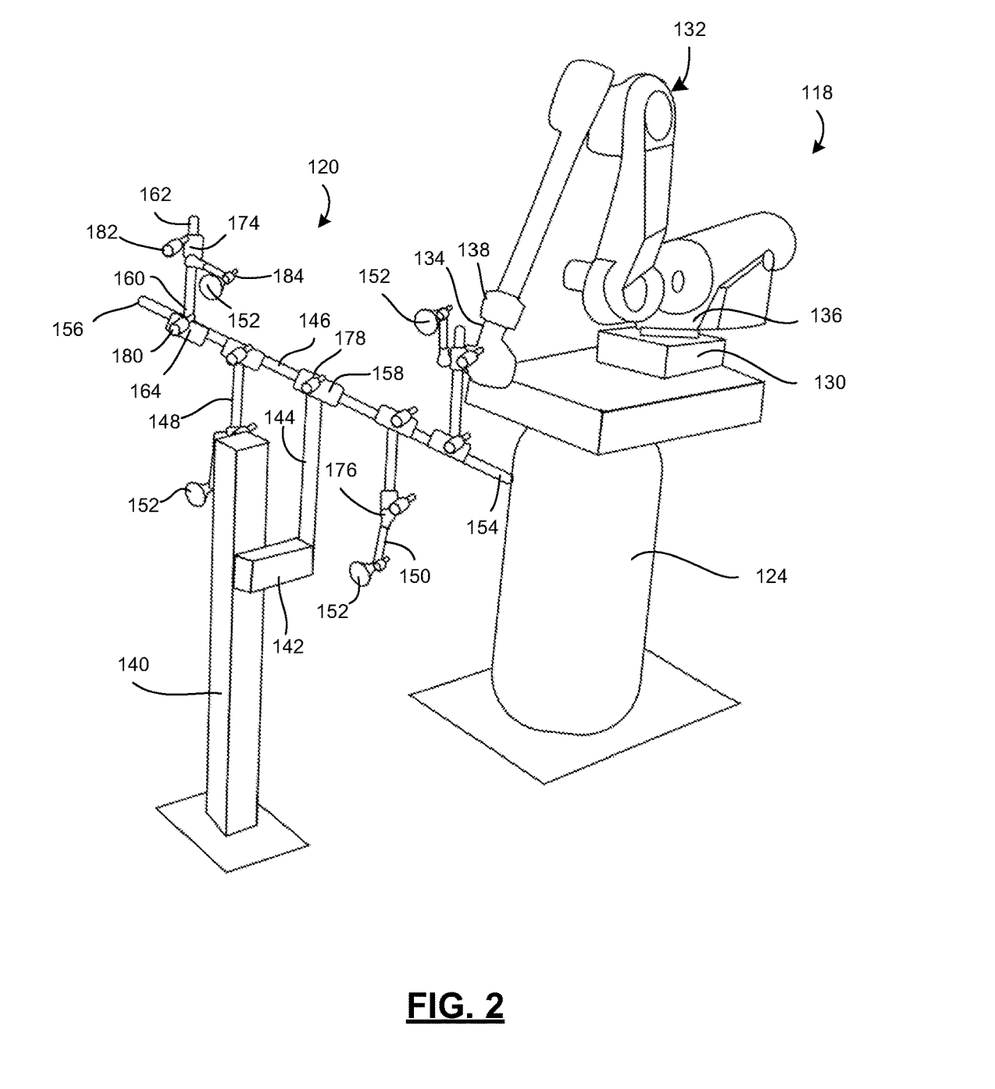
FIG. 2 is perspective view of an example robot and an end effector.
Figure 3:
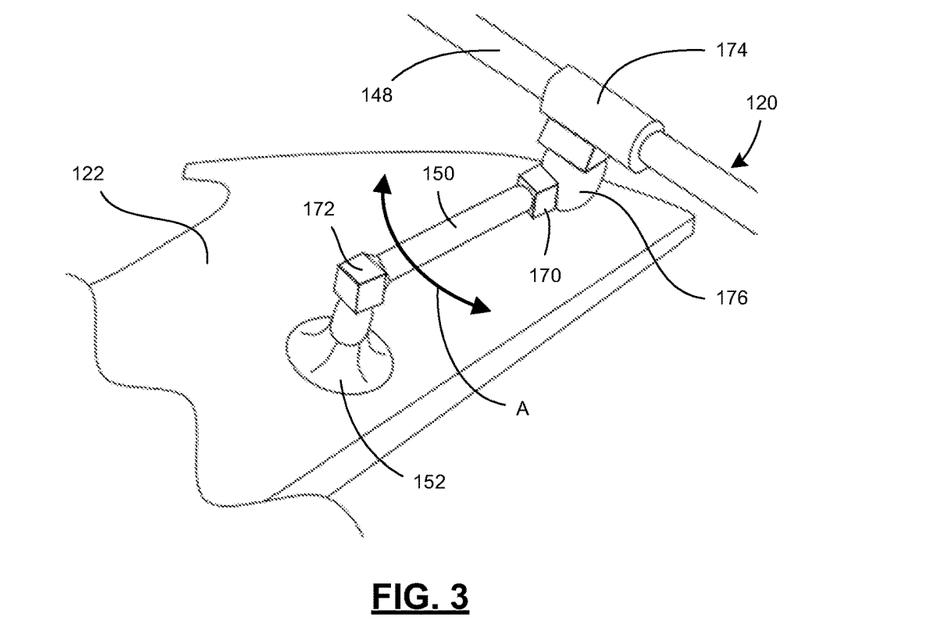
FIG. 3 is a partial perspective view of the example end effector attached to a vehicle component.
Figure 4:
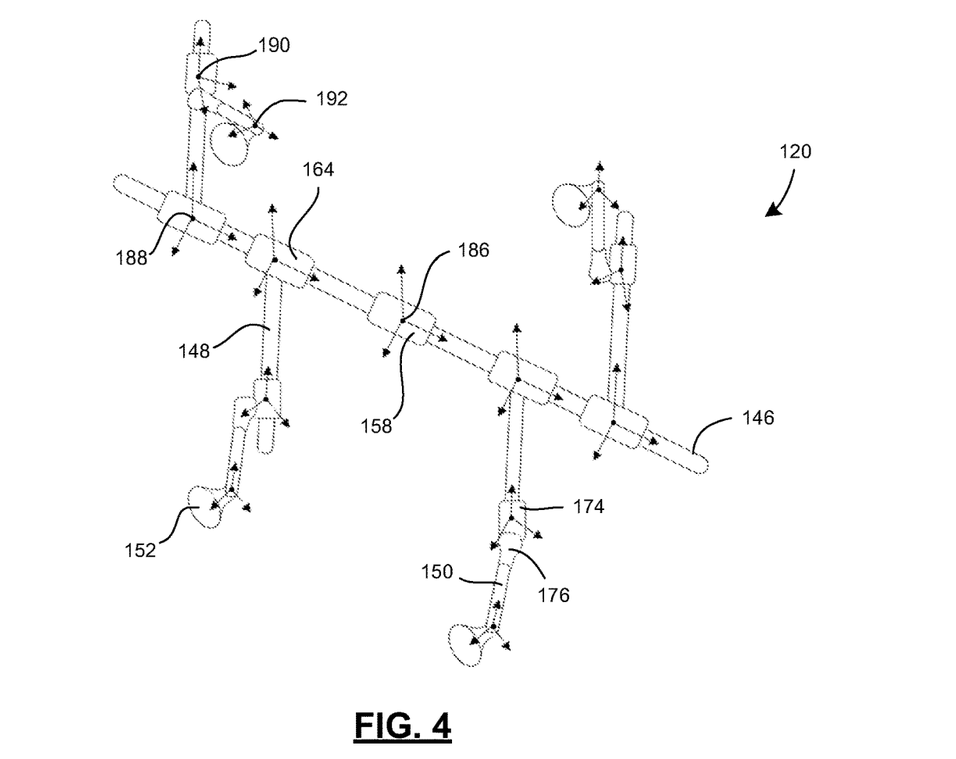
FIG. 4 is a perspective view of the example end effector.

With additional reference to FIGS. 2-4, an example robot 118 with an example end effector 120 is shown. FIG. 2 is a perspective view of the example robot 118. FIG. 3 is a partial perspective view of the example end effector 120 attached to a vehicle component 122. FIG. 4 is perspective view of the example end effector 120.

The example robot 118 is a 6 degrees of freedom (DOF) robot. However, any suitable robot may be used, such as a 7 DOF or higher robot. Additionally, the example end effector 120 is a 5 DOF end effector. However, the end effector 120 may be any suitable end effector, such as a 6 DOF end effector.

The robot 118 may be disposed on a first stand 124, as illustrated, or alternatively, disposed on a floor surface. The robot 108 may include a robot base 130, a robot arm 132, and a reconfiguration tool 134. The end effector 120 is connectable to and disconnectable from the robot 108. The robot arm 132 extends between a first end 136 and a second end 138 that is opposite the first end 136. The robot arm 132 may be attached to the robot base 130 at the first end 136 and coupled to the end effector 120 at the second end 138. The robot arm 132 is movable relative to the robot base 130.

The second end 138 of the robot arm 132 may be attached to the reconfiguration tool 134 and configured to interact with the end effector 120. The reconfiguration tool 134 may be configured to change the configuration of the end effector 120 by adjusting one or more components (e.g., branches, arms, attachment devices, etc.) of the end effector 120. In the illustrated example of FIG. 2, the reconfiguration tool 134 is a pneumatic torque wrench, referred to as a nutrunner. However, one or more other suitable reconfiguration tools may additionally or alternatively be used. The reconfiguration tool 134 may be connectable to and disconnectable from the robot arm 132. For example, the reconfiguration tool 134 may be disconnected from the robot arm 132 after adjusting the end effector 120 to one configuration.

The second end 138 of the robot arm 132 may be attached and connected to the end effector 120 and configured to move the end effector 120. For example, FIG. 2 illustrates the end effector 120 sitting on a second stand 140 using a tool changer 142. The configuration of the end effector 120 may be adjusted using the reconfiguration tool 134 while the end effector 120 rests on the second stand 140.

FIG. 3 illustrates the end effector 120 holding the vehicle component 122. The robot arm 132 may move the end effector 120 from the second stand 140 to the vehicle component 122 and actuate one or more components of the end effector 120 to hold the vehicle component 122. The vehicle component 122 is illustrated as a vehicle hood. However, the vehicle component 122 may be other vehicle components. The present application is also applicable to non-vehicle components.

The end effector 120 includes a support rod 144, a main rod 146, rod branches 148 that extend from the main rod 146, a rod arm 150 that extends from each rod branch 148, and an attachment device 152 disposed at each rod arm 150. In the illustrated example, the rod branches 148 includes four rod branches. However, a greater or lesser number of rod branches 148 may be used. Additionally, the attachment device 152 is a suction cup in the illustrated example. However, one or more other suitable types of attachment devices may be used.

The main rod 146 extends linearly between a third end 154 and a fourth end 156 that is opposite the third end 154. A connector 158 may be disposed between the third and fourth ends 154, 156. The connector 158 may be used to secure the end effector 120 to the support rod 144. The second end 138 of the robot arm 132 may connect to the connector 158 to move and actuate the end effector 120. The attachment devices 152 may be actuated to hold the vehicle component 122 pneumatically or in another suitable manner. For example, the robot 118 may draw air from within the suction cups to hold the vehicle component 122 using the attachment devices 152.

Each rod branch 148 may extend between a fifth end 160 and a sixth end 162 that is opposite the fifth end 160. The fifth end 160 is attached to the main rod 146 using a first sleeve 164. The first sleeve 164 may extend annularly about the main rod 146. The first sleeve 164 is configured to be slidable (in this example horizontally) along the main rod 146 and rotatable about the main rod 146. Each rod branch 148 may be substantially perpendicular to the main rod 146.

Each rod arm 150 may extend between a seventh end 170 and an eighth end 172 that is opposite the seventh end 170 (FIG. 3). The seventh end 170 is attached to the rod branch 148 using a second sleeve 174 and a swing connector 176. The second sleeve 174 may extend annularly about the rod branch 148. The second sleeve 174 is configured to be slidable (in this example vertically) along the rod branch 148 and rotatable about the rod branch 148. The swing connector 176 is coupled to the second sleeve 174 and attached to the seventh end 170. The swing connector 176 is configured to swing (i.e., pivot) the rod arm 150 relative to the rod branch 148 in an angular direction A. The eighth end 172 is attached to the attachment device 152.

Identifiers are disposed on an outer surface of the end effector 120. In the illustrated example shown in FIG. 2, a first identifier 178 is disposed on the main rod 146, a second identifier 180 is disposed on the first sleeve 164, a third identifier 182 is disposed on a second sleeve 174, and a fourth identifier 184 is disposed on the eighth end 172 of the rod arm 150. However, a greater or lesser number of identifiers may be used, and the identifiers may be disposed on other locations on the end effector 120. In some configurations, identifiers may also be disposed on static components within the vehicle manufacturing plant, such as on a floor or wall surface.

As shown in FIG. 4, a series of coordinate systems may be determined visually on the end effector 120 from the first and second images. The system of coordinates may include a first coordinate system 186, a second coordinate system 188, a third coordinate system 190 and a fourth coordinate system 192. The first coordinate system 186 is determined in a location of the first identifier 178 on the main rod 146. The first coordinate system 186 may be positioned at the connector 158 or an alternative position on the main rod 146 that is non-adjustable. The second coordinate system 188 is determined in a location of the second identifier 180 on the first sleeve 164. The third coordinate system 190 is determined in a location of the third identifier 182 on the second sleeve 174. The fourth coordinate system 192 is defined in a location of the fourth identifier 184 on the eighth end 172 of the rod arm 150. The first coordinate system 186 serves as a reference coordinate system for the end effector 120 and the second, third, and fourth coordinate systems 188, 190, 192 may be determined for each of the attachment devices 152 of the end effector 120.

Figure 5:
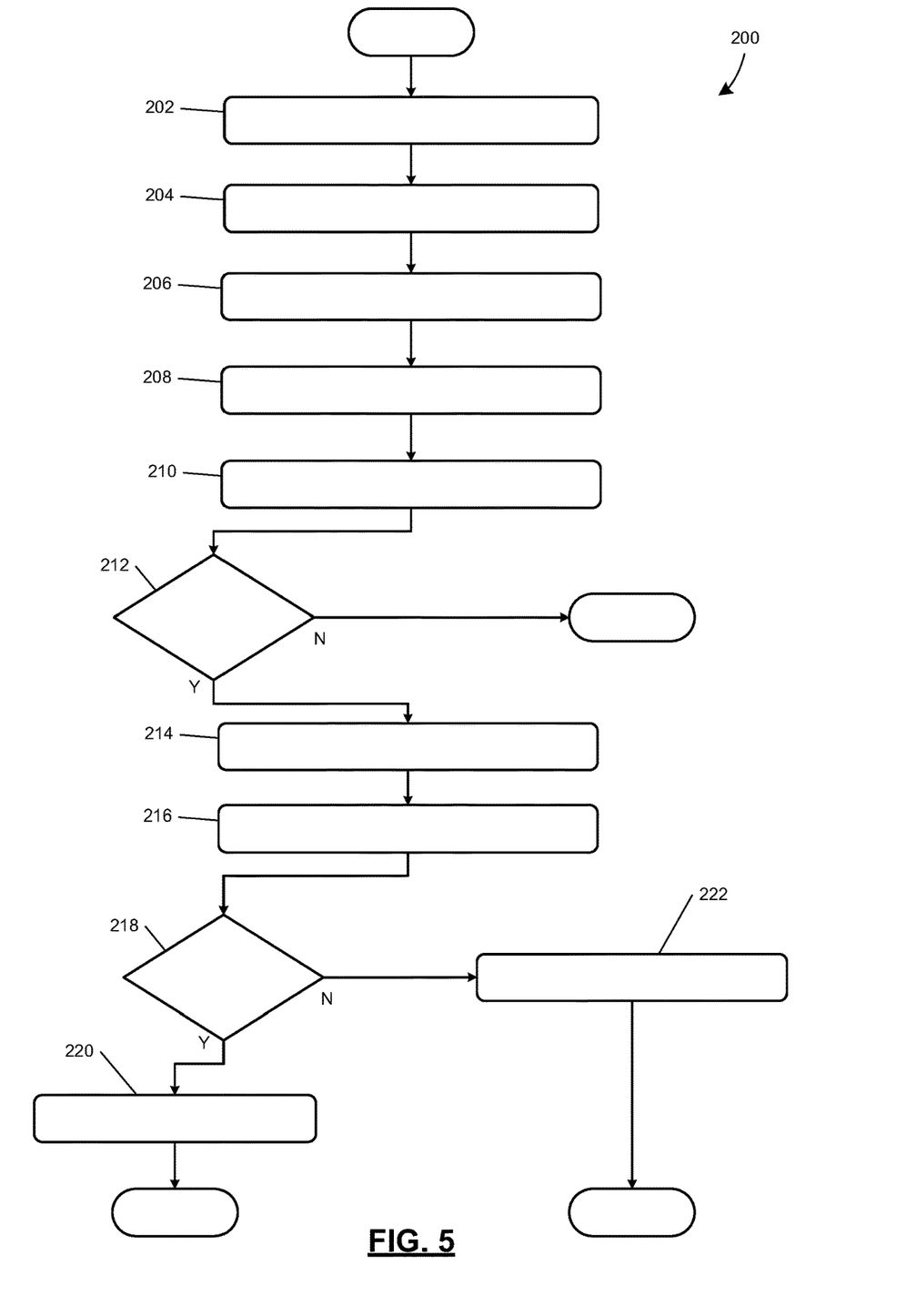
FIG. 5 is a flowchart depicting an example method of the tool reconfiguration system.

FIG. 5 is a flowchart depicting an example method 200 of the tool reconfiguration system 100 using the example end effector 120.

At 202, the first and second cameras 112, 114 of the photogrammetry module 102 capture first and second images of the identifiers 178, 180, 182, 184 of the end effector 120 and transmit the first and second images to the adjustment module 104.

At 204, the adjustment module 104 detects the identifiers 178, 180, 182, 184 within the first and second images and determines a location of the first coordinate system 186, the second coordinate system 188, the third coordinate system 190, and the fourth coordinate system 192 on the end effector 120 based on the locations and orientations of the respective identifiers 178, 180, 182, 184. The adjustment module 104 determines the present configuration of the end effector 120 based on the series of coordinate systems.

At 206, the adjustment module 104 determines a first change in the present configuration of the end effector 120 relative to the original configuration of the end effector 120 using the first and second coordinate systems 186, 188. The original configuration of the end effector 120 may be stored in memory. More specifically, the adjustment module 104 determines whether the first sleeve 164 has slidably moved along the main rod 146 relative to an original position of the first sleeve 164 on the main rod 146 in the original configuration. If the first sleeve 164 has moved, the adjustment module 104 calculates an amount of movement and a direction of movement along the main rod 146 based on the position of the first and second coordinate systems 186, 188 in the present configuration relative to the position of the first and second coordinate systems 186, 188 in the original configuration.

Additionally, the adjustment module 104 determines whether the first sleeve 164 has rotated about the main rod 146 relative to a rotation of the first sleeve 164 in the original configuration. If the first sleeve 164 has rotated, the adjustment module 104 calculates an amount of rotation and a direction of rotation about the main rod 146 based on the position of the first and second coordinate systems 186, 188 in the present configuration relative to the position of the first and second coordinate systems 186, 188 in the original configuration. In other words, the first change in the present configuration of the end effector 120 relative to the original configuration includes the amount of movement and direction of movement of the first sleeve 164 along the main rod 146 and the amount of rotation and direction of rotation about the main rod 146.

At 208, the adjustment module 104 determines a second change in the present configuration of the end effector 120 relative to the original configuration of the end effector 120 using the second and third coordinate systems 188, 190. More specifically, the adjustment module 104 determines whether the second sleeve 174 has slidably moved along the rod branch 148 relative to an original position of the second sleeve 174 on the rod branch 148 in the original configuration. If the second sleeve 174 has moved, the adjustment module 104 calculates an amount of movement and a direction of movement along the rod branch 148 based on the position of the second and third coordinate systems 188, 190 in the present configuration relative to the position of the second and third coordinate systems 188, 190 in the original configuration.

Additionally, the adjustment module 104 determines whether the second sleeve 174 has rotated about the rod branch 148 relative to a rotation of the second sleeve 174 in the original configuration. The adjustment module 104 calculates an amount of rotation and a direction of the rotation about the rod branch 148 based on the position of the second and third coordinate systems 188, 190 in the present configuration relative to the position of the second and third coordinate systems 188, 190 in the original configuration. In other words, the second change in the present configuration of the end effector 120 relative to the original configuration of the end effector 120 includes the amount of movement and direction of movement of the second sleeve 174 along the rod branch 148 and the amount of rotation and direction of rotation about the rod branch 148.

At 210, the adjustment module 104 determines a third change in the present configuration of the end effector 120 relative to the original configuration of the end effector 120 using the third and fourth coordinate systems 190, 192. More specifically, the adjustment module 104 determines whether the eighth end 172 of the rod arm 150 has rotated relative to an original position of the second arm end 174 in the original configuration. If the eighth end 172 has rotated, the adjustment module 104 calculates an amount of rotation and a direction of the rotation based on the position of the third and fourth coordinate systems 190, 192 in the present configuration relative to the position of the third and fourth coordinate systems 190, 192 in the original configuration. In other words, the third change in the present configuration of the end effector 120 relative to the original configuration of the end effector 120 includes the amount and direction of rotation of the eighth end 172 of the rod arm 150.

At 212, the adjustment module 104 determines whether the first, second, and third changes in the present configuration of the end effector 120 relative to the original configuration of the end effector 120 exceed a predetermined tolerance. If 212 is false, the method 200 ends. If 212 is true, the method 200 continues to 214.

At 214, the adjustment module 104 automatically generates a vision-servoing command using the first, second, and third changes in the present configuration of the end effector 120 relative to the original configuration of the end effector 120. The adjustment module 104 transmits the vision-servoing command to the robot control module 106.

At 216, the robot control module 106 generates a robot command using the vision-servoing command. More specifically, the robot control module 106 processes the first, second, and third changes and determines a global change (i.e., absolute change) in the present configuration of the attachment device 152 relative to the original configuration of the attachment device 152. The global change includes an amount and direction of change of the attachment device 152 relative to the first coordinate system 186.

At 218, the robot control module 106 determines whether the global change of the attachment device 152 from the original configuration to the present configuration was intentional. In some examples, the robot control module 106 may request user input indicative of whether the change was intentional.

If 218 is true (e.g., when user input is received indicative of the change being intentional), the method continues to 220. At 220, the robot control module 106 stores the present configuration for the given vehicle component 122 and transmits the robot command to the robot 118. Using the robot command, the robot arm 132 positions the reconfiguration tool 134 to the correct location of the attachment devices 152 of the end effector 120, for example, to change the configuration of the end effector 120 for a different vehicle component. Additionally, for future interactions with the given vehicle component 122, the robot control module 106 actuates the end effector 120 to the present configuration.

If 218 is false, the method 200 continues to 222. At 222, the robot control module 106 transmits the robot command to the robot 118. Using the robot command, the robot 118 positions the reconfiguration tool 134 to the present location of the attachment devices 152 and adjusts the attachment devices 152. In one example, the reconfiguration tool 134 adjusts the attachment devices 152 to revert the end effector 120 from the present configuration back to the original configuration. For future interactions with the vehicle component 122, the robot control module 106 actuates the end effector 120 to the original configuration. In another example, the reconfiguration tool 134 adjust the attachment devices 152 of the end effector 120 to change the configuration of the end effector 120 for a different vehicle component.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A tool reconfiguration system comprising:
a robot;
an end effector configured to be attached to the robot and to a vehicle component, the end effector being adjustable between a plurality of configurations of suction cups;
a photogrammetry module including a first camera that is configured to capture images of the end effector;
an adjustment module configured to:
receive the images of the end effector; and
determine whether the end effector has been adjusted from a first configuration of the suction cups to a second configuration of the suction cups based on at least one of the images; and
a robot control module configured to, in response to a determination that the end effector has been adjusted from the first configuration of the suction cups to the second configuration of the suction cup, selectively actuate one or more components of the end effector and adjust a present configuration of the suction cups of the end effector to one of the first configuration of the suction cups.

2. The tool reconfiguration system of claim 1, wherein:
the end effector includes two or more identifiers disposed on an outer surface of the end effector; and
the adjustment module is configured to determine whether the end effector has been adjusted from the first configuration to the second configuration using the identifiers captured in the at least one of the images.

3. The tool reconfiguration system of claim 2, wherein:
the adjustment module is configured to determine coordinate systems on the end effector based on positions of the two or more identifiers, respectively; and
the adjustment module is configured to determine whether the end effector has been adjusted from the first configuration to the second configuration based on a change in the coordinate systems.

4. The tool reconfiguration system of claim 3, wherein each of the coordinate systems includes an origin point, an X axis, a Y axis, and a Z axis.

5. The tool reconfiguration system of claim 3, wherein the change includes a change in at least one of an X direction, a Y direction, and a Z direction.

6. The tool reconfiguration system of claim 3, wherein the change includes a change in angle of at least one of an X direction, a Y direction, and a Z direction.

7. The tool reconfiguration system of claim 1, the robot control module is configured to store the second configuration in memory in response to receipt of user input indicating the end effector was intentionally adjusted from the first configuration to the second configuration.

8. The tool reconfiguration system of claim 1, further comprising a reconfiguration tool that is configured to actuate one or more of the components of the end effector.

9. The tool reconfiguration system of claim 8, wherein the robot control module is configured to actuate the reconfiguration tool thereby actuating the one or more of the components of the end effector and adjusting the present configuration of the end effector to the first configuration.

10. The tool reconfiguration system of claim 1, wherein the end effector includes a main rod, rod branches adjustably attached to the main rod, and an attachment device adjustably attached to each rod branch.

11. The tool reconfiguration system of claim 10, wherein:
the end effector includes a first identifier disposed on the main rod; and
the adjustment module is configured to determine a first coordinate system on the main rod based on a position of the first identifier.

12. The tool reconfiguration system of claim 11, wherein:
at least one rod branch of the rod branches is slidably and rotatably attached to the main rod using a first sleeve;
the end effector includes a second identifier disposed on the first sleeve; and
the adjustment module is configured to determine a second coordinate system on the first sleeve based on a position of the second identifier.

13. The tool reconfiguration system of claim 12, wherein the adjustment module is configured to determine a first change in the present configuration relative to the first configuration of the first sleeve using the first and second coordinate systems.

14. The tool reconfiguration system of claim 13, wherein:
the attachment device is slidably and rotatably attached to the respective rod branch using a second sleeve;
the end effector includes a third identifier disposed on the second sleeve; and
the adjustment module is configured to determine a third coordinate system on the second sleeve based on a position of the third identifier.

15. The tool reconfiguration system of claim 14, wherein the adjustment module is configured to determine whether the end effector has been adjusted from the first configuration to the second configuration based on the first, second, and third coordinate systems.

16. The tool reconfiguration system of claim 1, wherein:
the photogrammetry module includes a second camera configured to capture second images; and
the adjustment module is configured to:
receive the second images of the end effector; and
determine whether the end effector has been adjusted from the first configuration to the second configuration based on the images and the second images.

17. A tool reconfiguration method comprising:
capturing images of an end effector that is adjustable between a plurality of configurations of suction cups;
determining whether the end effector has been adjusted from a first configuration of the suction cups to a second configuration of the suction cups based on at least one of the images; and
in response to a determination that the end effector has been adjusted from the first configuration of the suction cups to the second configuration of the suction cups, selectively actuating one or more components of the end effector and adjusting a present configuration of the suction cups of the end effector to the first configuration.

18. The tool reconfiguration method of claim 17, wherein the determining whether the end effector has been adjusted from the first configuration to the second configuration includes:
determining a first coordinate system based on a position of a first identifier that is disposed on the end effector and captured in the at least one of the images;
determining a second coordinate system based on a position of a second identifier that is disposed on the end effector and captured in the at least one of the images; and
determining whether the end effector has been adjusted from the first configuration to the second configuration based on a change in the first and second coordinate systems.

19. The tool reconfiguration method of claim 17, further comprising:
storing the second configuration in memory in response to receipt of user input indicating the end effector was intentionally adjusted from the first configuration to the second configuration.

20. The tool reconfiguration method of claim 18, wherein each of the first and second coordinate systems includes an origin point, an X axis, a Y axis, and a Z axis.

* * * * *